May 19, 1931.  R. A. WILLIAMS  1,806,274
BOWLING ALLEY
Filed Dec. 29, 1928   8 Sheets-Sheet 1

Inventor:
Raymond A. Williams,
by Walter E. Lombard.
Atty.

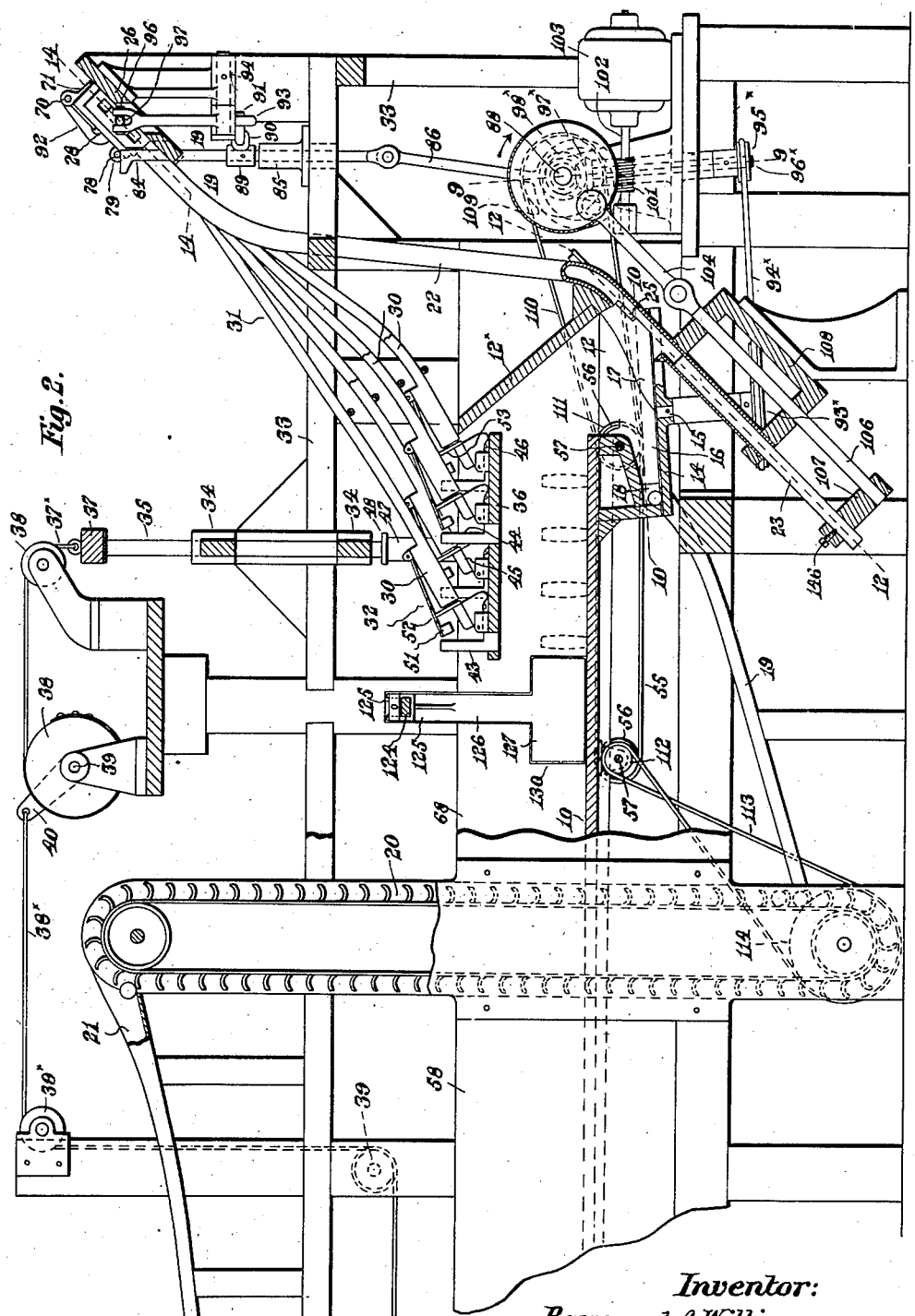

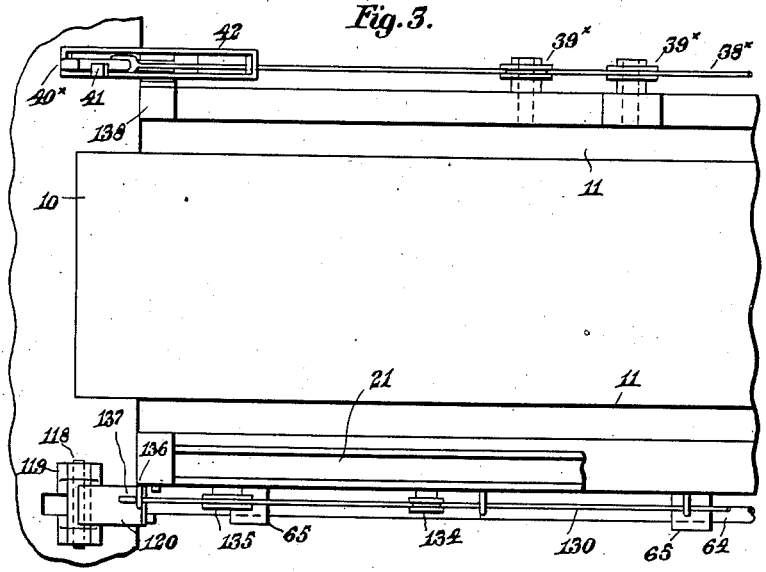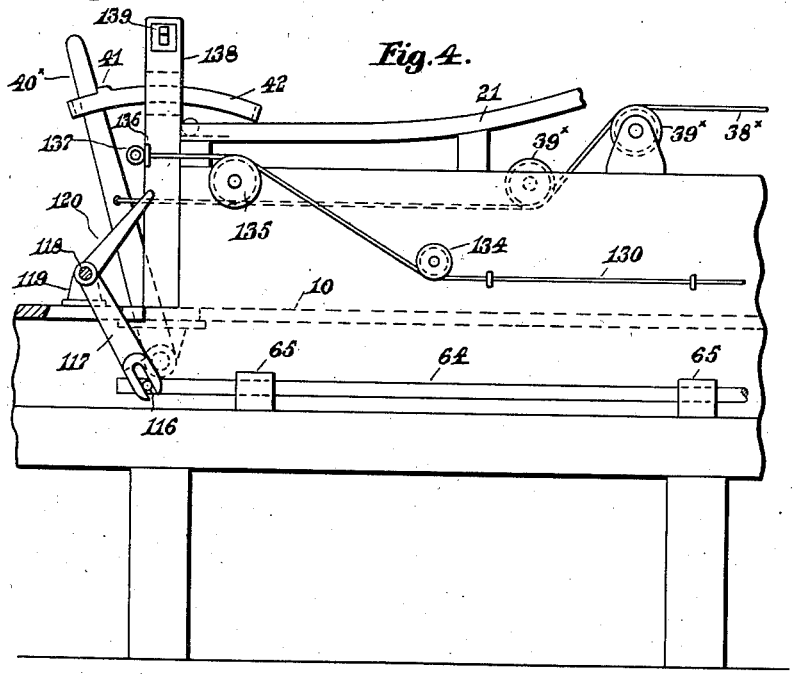

May 19, 1931.  R. A. WILLIAMS  1,806,274
BOWLING ALLEY
Filed Dec. 29, 1928  8 Sheets-Sheet 4
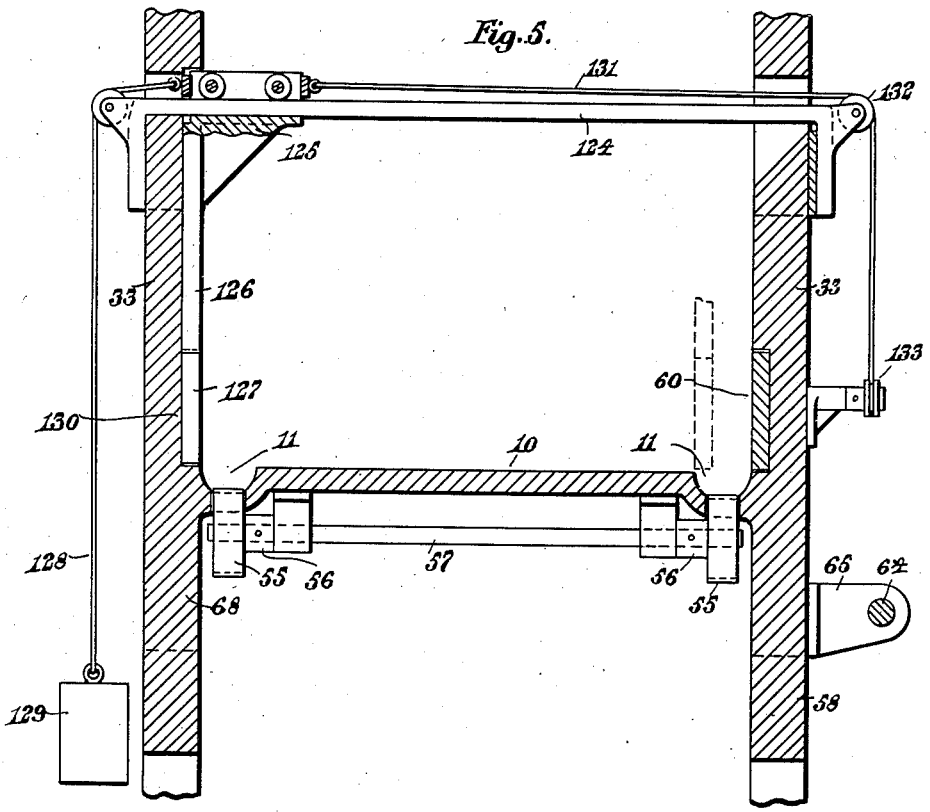
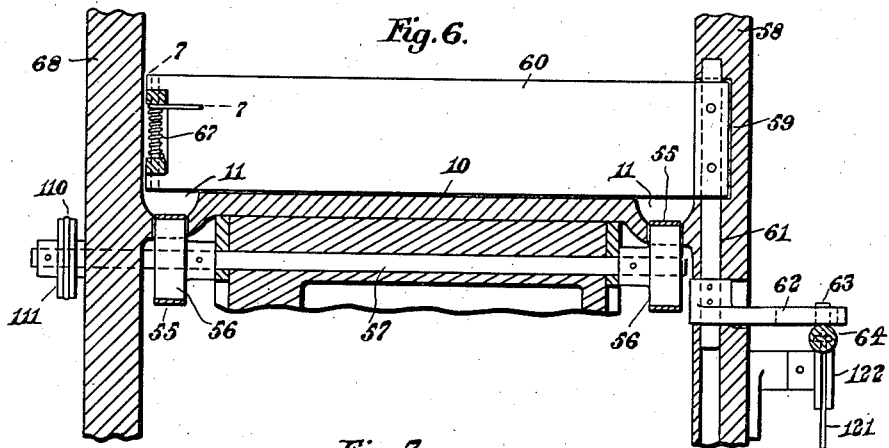
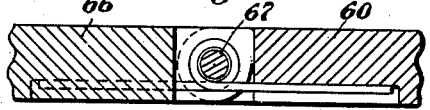
Inventor:
Raymond A. Williams,
by Walter E. Lombard,
Atty.

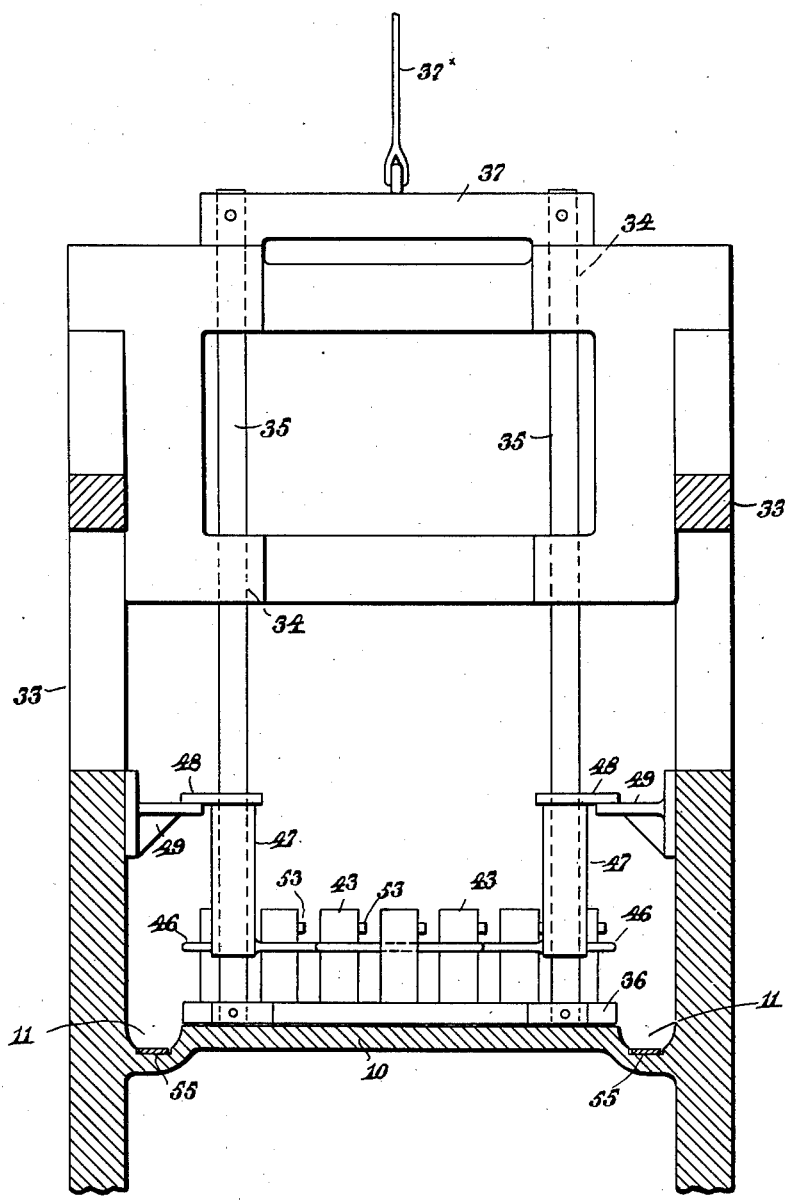

May 19, 1931.  R. A. WILLIAMS  1,806,274
BOWLING ALLEY
Filed Dec. 29, 1928   8 Sheets-Sheet 6
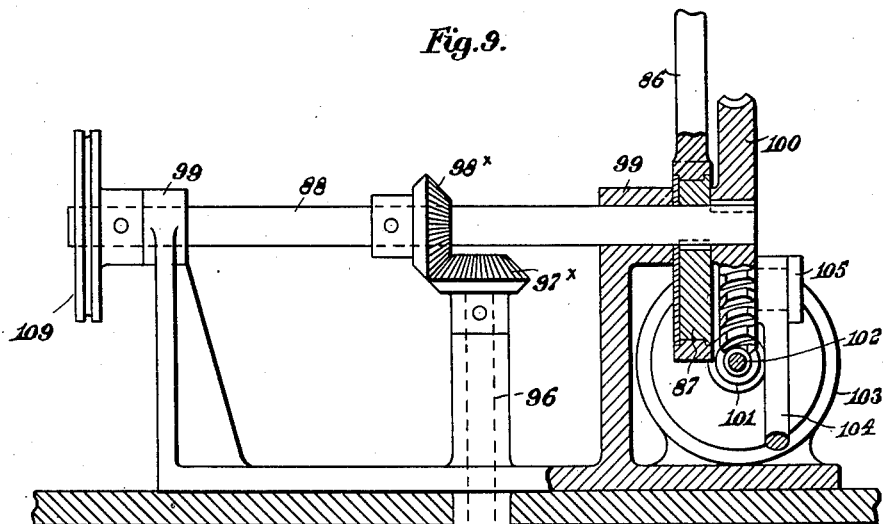
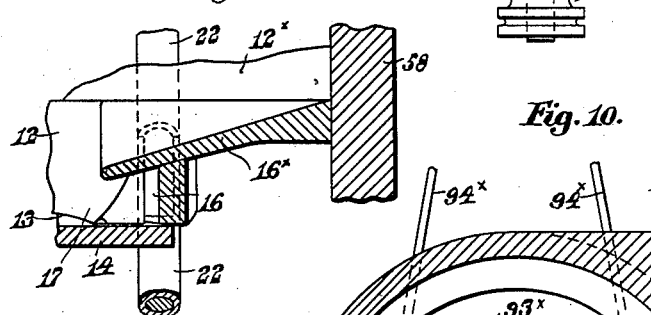
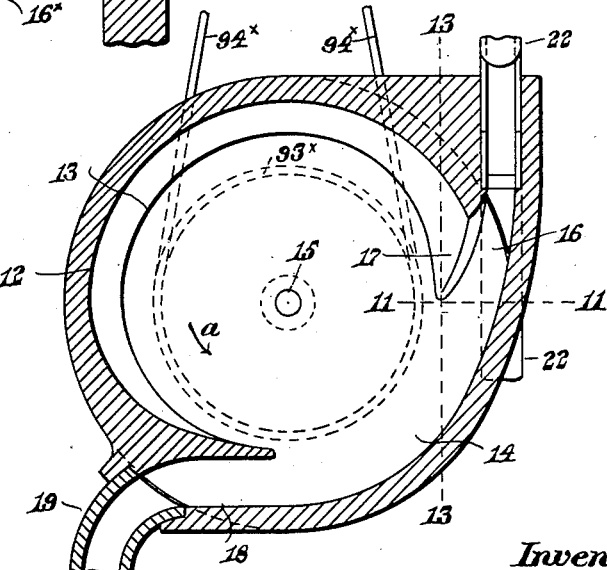
Inventor:
Raymond A. Williams,
by Walter E. Lombard,
Atty.

May 19, 1931.  R. A. WILLIAMS  1,806,274
BOWLING ALLEY
Filed Dec. 29, 1928   8 Sheets-Sheet 7
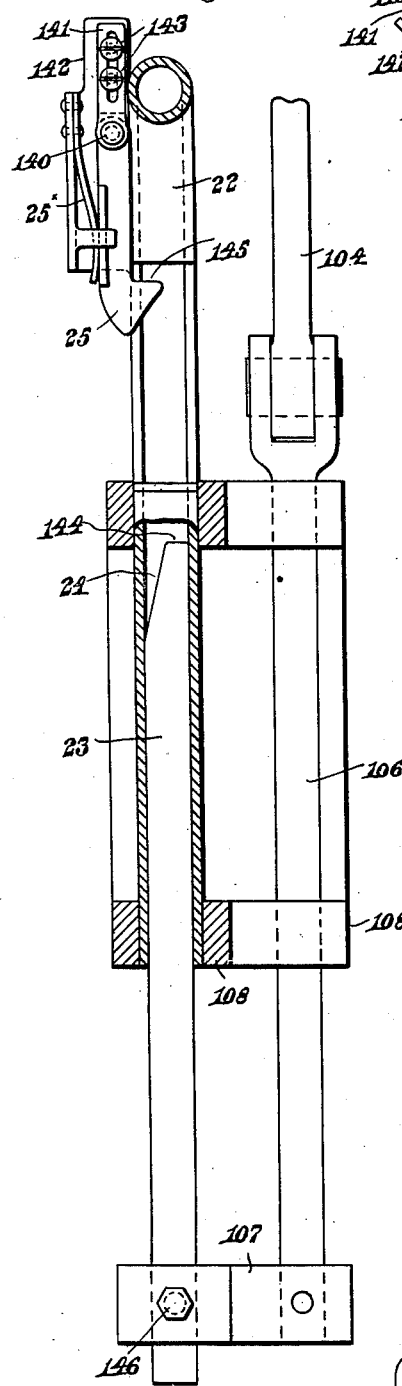
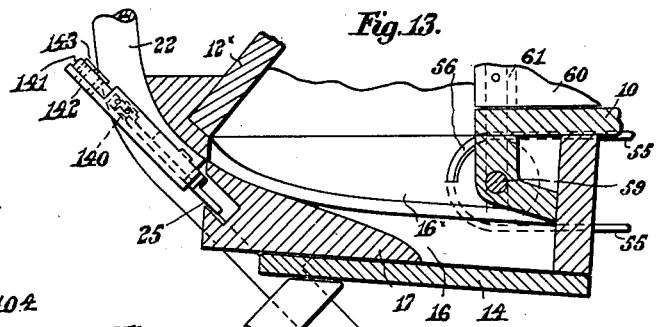
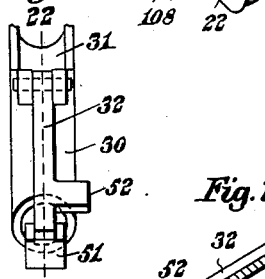
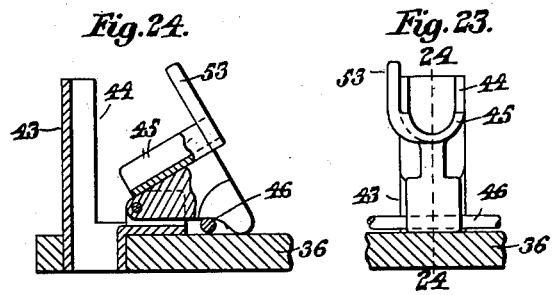
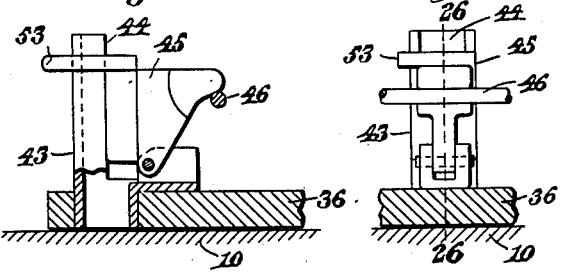
Inventor:
Raymond A. Williams,
by Walter E. Lombard,
Atty.

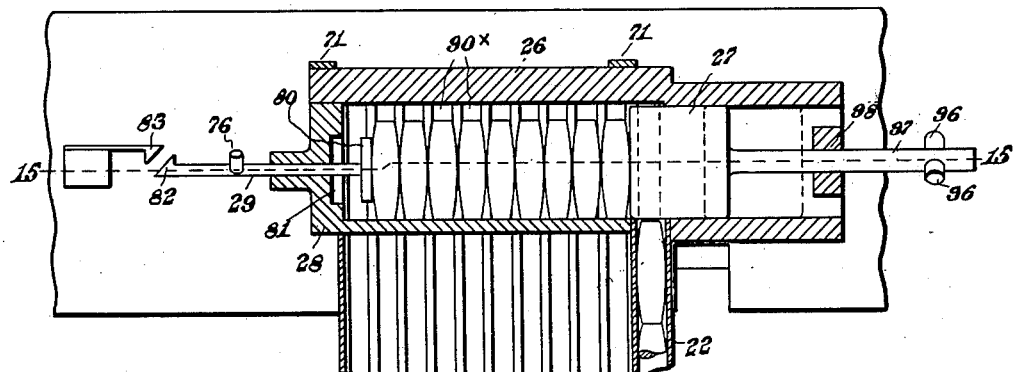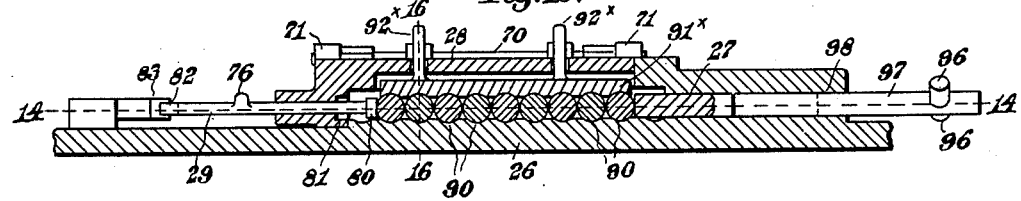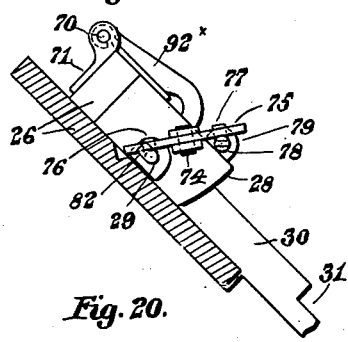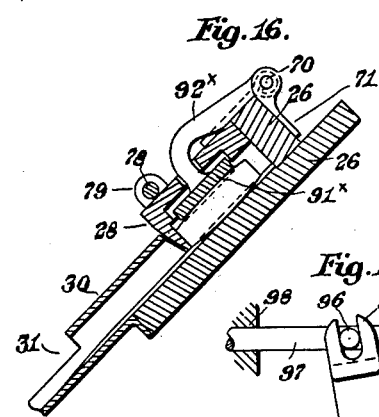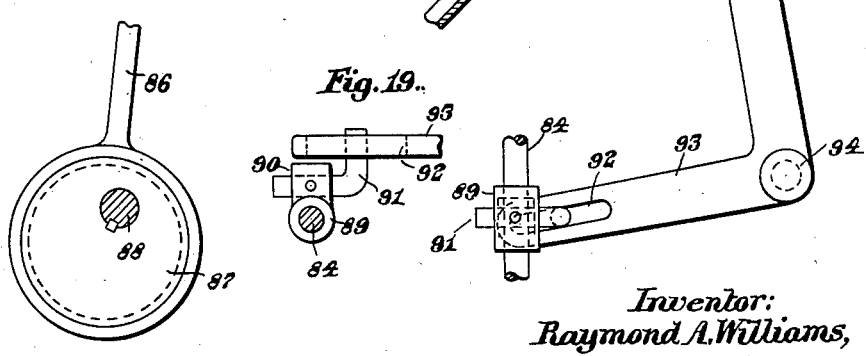

Patented May 19, 1931

1,806,274

UNITED STATES PATENT OFFICE

RAYMOND A. WILLIAMS, OF ARLINGTON, MASSACHUSETTS

BOWLING ALLEY

Application filed December 29, 1928. Serial No. 329,146.

This invention relates to bowling alleys and has for its object the production of means for collecting the used pins and balls, returning the balls to the head of the alley and automatically setting the pins upon the other end of said alley.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 2 represents a longitudinal vertical section of same on line 2, 2, on Fig. 1 with portions thereof shown in elevation.

Figure 3 represents a plan of the actuating mechanism at the head of the alley.

Figure 4 represents a side elevation of the same.

Figure 5 represents a vertical transverse section on line 5, 5, on Fig. 1.

Figure 6 represents a vertical transverse section on line 6, 6, on Fig. 1.

Figure 7 represents a section on line 7, 7, on Fig. 6.

Figure 8 represents a vertical transverse section on line 8, 8 on Fig. 1.

Figure 9 represents a vertical section on line 9, 9, on Fig. 2.

Figure 10 represents a horizontal section on line 10, 10, on Fig. 2.

Figure 11 represents a vertical section on line 11, 11, on Fig. 10.

Figure 12 represents a section on line 12, 12, on Fig. 2.

Figure 13 represents a section on line 13, 13 on Fig. 10.

Figure 14 represents a section on line 14, 14 on Figs. 2 and 15.

Figure 15 represents a section on line 15, 15 on Fig. 14.

Figure 16 represents a section on line 16, 16, on Fig. 15.

Figure 17 represents an end elevation of the pin magazine.

Figure 18 represents an elevation of the pin pushing lever.

Figure 19 represents a section on line 19, 19 on Fig. 2.

Figure 20 represents an elevation of the eccentric for actuating the pin pushing lever.

Figure 21 represents a plan of one of the pin conduits and showing the gate at the lower end thereof.

Figure 22 represents a section thereof on line 22, 22, on Fig. 21.

Figure 23 represents an elevation of one of the pin tipping devices in position to receive a pin.

Figure 24 represents a section on line 24, 24, on Fig. 23.

Figure 25 represents an elevation of said pin tipping device in position after the pin has been discharged therefrom.

Figure 26 represents a section of same on line 26, 26, on Fig. 25, and

Figure 27 represents a detail of construction to be hereinafter referred to.

Similar characters indicate like parts throughout the several figures of the drawings.

Figure 1:
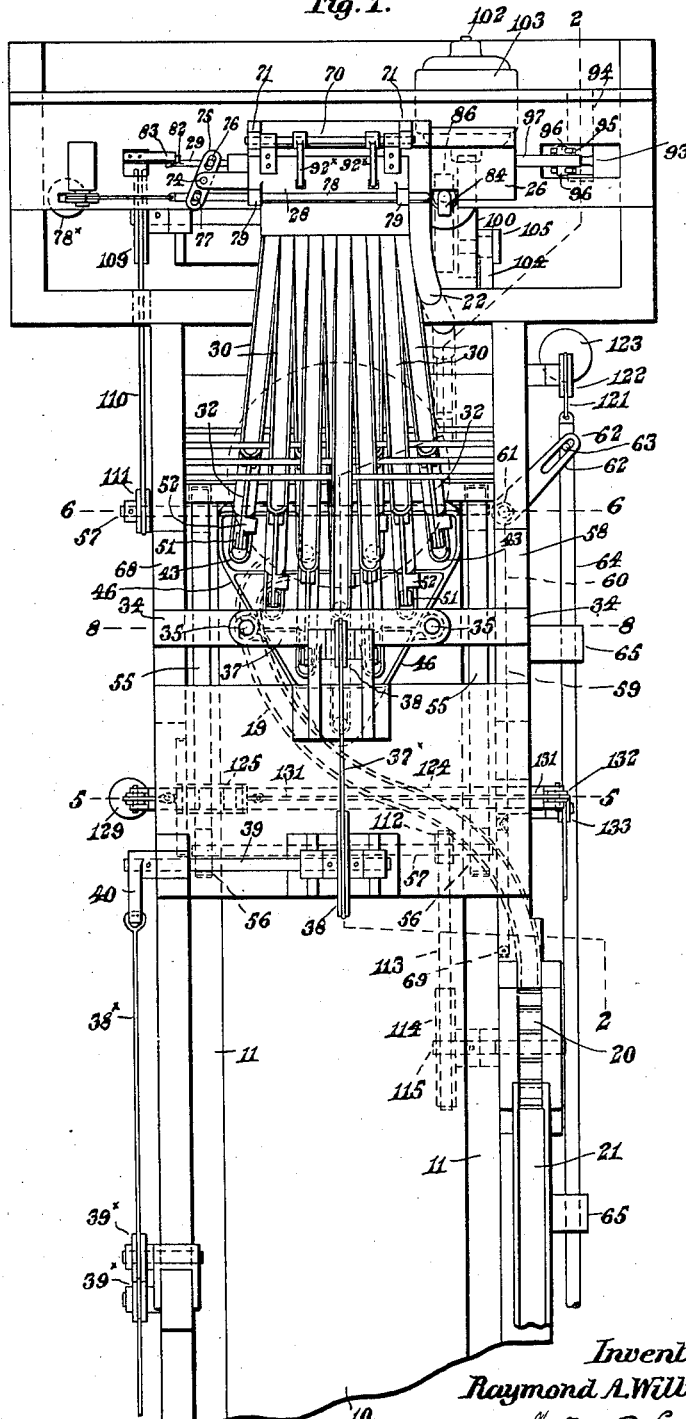
Figure 1 represents a plan of mechanism for setting pins on a bowling alley and embodying the principles of the present invention.

In the drawings, 10 is a bowling alley having gutters 11 at the sides thereof.

At the rear of the alley is a pit 12 having its sides inclined downwardly and inwardly toward a central opening 13.

At the rear of the pit 12 is an inclined back stop 12x adapted to deflect downwardly into the pit all balls and pins striking the front face of said back stop.

Within this opening 13 is a revoluble disk 14, said disk being mounted on a shaft 15 extending downwardly therefrom and rotated by mechanism to be hereinafter described.

The disk 14 is inclined downwardly toward the head of the alley.

At one side of the disk and tangential thereto is a pin chamber 16 adapted to receive a plurality of pins one above the other.

Above the chamber 16 is an inclined shelf 16x adapted to direct spent balls and pins into the pit 12 and onto the revoluble disk 14.

As the disk 14 rotates any upset pins which are delivered thereto will be carried toward the edges thereof by centrifugal action and as they reach the entrance to the chamber 16 some of these pins will be moved endwise into said chamber.

After the receptacle is full or the pins fail to approach the chamber 16 endwise, they will move over the prong 17 and return into the pit and be carried around again or the disk 14 and more pins will enter the chamber.

At the lower end of the disk 14 is a discharge opening 18 through which the spent balls rolling down the inclined surface of the disk 14 will enter and pass down an inclined chute 19 to an elevating mechanism 20 of any usual construction.

This elevating mechanism will deliver the balls to an inclined trough 21 down which they are adapted to roll to the head of the alley to be used again.

The chamber 16 communicates at the bottom with an opening near one end of a pin conduit 22.

Positioned in the lower end of the pin conduit 22 is a plunger 23 adapted to be reciprocated by mechanism to be hereinafter described, said plunger in its reciprocation being adapted to move the lower pin within the chamber 16 into the pin conduit 22.

On the return movement of the plunger 23 the next pin in the chamber 16 is adapted to drop down into the conduit 22 in the path of said plunger 23.

The feed end of the plunger 23 has an inclined surface 24 which coacts with a latch 25.

The latch 25 normally prevents a pin after having entered the pin conduit 22 from returning into the chamber 16.

The latch 25 is retained in the position shown in Fig. 12 by means of the spring 25x, which spring will yield sufficiently to permit a pin to be forced by plunger 23 into the conduit 22.

The upper end of the pin conduit 22 extends into a magazine 26, this magazine being inclined.

The interior chamber of this magazine 26 has a length adapted to receive eleven pins side by side.

When a pin has been discharged endwise from the upper end of the pin conduit 22 into the right hand end of said magazine 26 a pushing member 27 contacts with the side thereof and will push the pin sidewise further into the magazine 26 and at the completion of this operation will return to its normal position preparatory to forcing another pin into the magazine.

The magazine 26 is provided with a pivoted gate 28 one portion of which extends over the open lower end of the magazine and retains the pins in said magazine until the magazine is filled with the required number of pins.

When the last pin is being pushed into the magazine 26 the first pin which entered the magazine will come into contact with a reciprocable member 29 forming part of a tripping mechanism which when actuated will permit the operation of other mechanism to cause the gate 28 to be opened and permit the simultaneous discharge of ten of the pins within the magazine 26.

This tripping mechanism and gate opening mechanism will be described hereinafter.

The pins in the magazine will move downwardly therefrom into tubes 30, portions of which near their upper ends are cut away as indicated at 31, forming semi-cylindrical troughs.

Each of these tubes 30 is provided at its lower end with a weighted gate 32 pivoted thereto and adapted to be moved upwardly to uncover the lower ends of the tubes 30 when it is desired to release the pins therefrom.

The magazine 26 is supported by means of a framework 33 extending upwardly from the alley.

This framework 33 has guide members 34 thereon in which reciprocate two rods 35 having secured to their lower ends a triangular plate 36.

The top of the rods 35 are connected by a bar 37 to which is secured one end of a chain or cable 37x passing over two pulleys 38 one larger than the other, with its opposite end secured to the larger pulley.

The larger pulley 38 is secured to an oscillating shaft 39 having a lever 40 secured to the outer end thereof.

This lever 40 has connected thereto a cable 38x which passes over and under pulleys 39x and has its opposite end secured to a lever 40x at the head of the alley 10.

By means of the lever 40x the plate 36 may be raised to its highest position and the lever locked by the projection 41 on the segment 42.

The plate 36 has ten openings therethrough in the exact position that the pins should be set upon the alley.

Extending upwardly from the plate 36 and registering with these ten holes are ten cylindrical pockets 43, the upper ends of which are cut away as indicated at 44 leaving the upper portions of the pockets semi-cylindrical.

Pivoted to the lower end of each pocket 43 is a semi-cylindrical member 45 adapted when in its vertical position to coact with the semi-cylindrical portion 44 to complete the cylinder.

These members 45 are adapted when the plate 36 is in its upper position to register with the lower ends of the tubes 30 and receive the pins as they are discharged therefrom when the gates 32 are opened.

When the pins rest upon the inclined members 45 one end of each pin abuts the opposite wall of the pocket 43 and all of the pins are thus retained temporarily in an inclined position.

Beneath the members 45 and contacting therewith is a spider 46 which is adapted to be raised and lowered with the plate 36 and the rods 35.

The spider 46 normally rests on the plate 36 but has tubular members 47 surrounding the rods 35, these tubular members 47 having projections 48 at the top thereof adapted to come into contact with the fixed stops 49 to limit the downward movement of said spider 46 while the plate 36 continues to move downwardly to a plane adjacent the top of the alley.

When the plate 36 is moving downwardly the spider 46 will move downwardly therewith until the projections 48 come into contact with the stop members 49 when further downward movement of the spider will be prevented.

As the pockets 43 continue to move downwardly with the plate 36 and the members 45 are in contact with portions of the spider 46 which has already come to a rest, these members 45 will be moved about their pivots to bring the semi-cylindrical portions thereof into a vertical position.

When the members 45 have been moved about their pivots as just described all the pins within the pockets 43 will have been tilted into a vertical position and then may drop through the openings in the plate 36 with their lower ends resting upon the top of the alley in their required positions.

When the plate 36 again moves upwardly the pins will be left properly set upon the alley and the members 45 will return by their own weight to their inclined positions.

When the plate 36 reaches its upper position it will remain in this position until another pin setting is required and then the gates at the lower end of the conduits 30 will be opened again to allow another set of pins to move downwardly upon the members 45 preparatory to another setting.

The gates 32 are normally closed by weights 51 on the lower ends thereof and each gate is provided with a lateral projection 52 in the path of a pin 53 extending upwardly from one of the inclined members 45.

When the plate 36 is raised with the members 45 thereon, the pins 53 will come into contact with the projections 52 and simultaneously open all of the gates 32 thereby permitting the delivery of the lowest pin in each tube 30 to be deposited upon a member 45.

The tubes 30 have a reserve supply of pins therein after each delivery so that whenever the lever 40x is actuated to raise the plate 36 all of the pockets 43, 45, will receive a supply of pins preparatory to a new pin setting.

The weights 51 are positioned a short distance from the lower ends of the tubs 30 so that portions of the lower pins in said tubes extend beyond the ends of said tubes.

After the gates 32 have been opened and these lower pins deposited on the members 45, the plate may be moved downwardly and during this downward movement the weights 51 will close the gates 32 quickly before another set of pins can be discharged from the tubes 30, the downward movement of the pins being arrested by these weights 51 when returned to their normal position as shown in Fig. 22.

At the bottom of the gutters 11, 11, are endless belts 55, 55, which carry into the pit 12 any upset pins which may roll into said gutters.

These belts 55 move over pulleys 56 on shafts 57 which shafts may be rotated continuously by any suitable means while the alley is being used.

In one side board 58 of the alley is a recess 59 in which is normally disposed an arm 60 secured to a vertical shaft 61 having secured thereto an arm 62 having a slot therein through which extends a pin 63 on a reciprocating rod or bar 64.

The bar 64 is mounted in bearings 65 and adapted to be reciprocated by suitable means located at the head of the alley.

The arm 60 has substantially a length equal to the width of the alley.

By actuating the bar 64 and oscillating the shaft 61, this arm 60 may be moved across the alley so as to remove all deadwood from the alley.

It often happens, however, that pins will land considerably in advance of the pin spots and to clear all such pins from the alley is quite essential.

To accomplish this the arm 60 has pivoted to its free end an extension 66, the pivot consisting of a spring hinge 67, the spring of which has sufficient tension to retain the extension 66 in alinement with the arm 60 even when coming in contact with the deadwood on the alley.

When the arm 60 is moved about the axis of its pivot 61 the outer end of the extension 66 will come into contact with the opposite side board 68 and cause said extension to be moved about its pivot 67 so as to permit the arm 60 to assume a position across the alley perpendicular to the side board 58.

To prevent injury to the side board 68 when the extension 66 contacts therewith the end of said extension is provided with some form of antifriction device such as the roller 69 (shown in dotted lines in Fig. 1).

By means of this mechanism all deadwood may be removed from the alley considerably in advance of the pin spots.

Various forms of mechanism may be used to actuate the different devices of the pin setting mechanism without departing from the scope of the invention, it being deemed sufficient in the present application to show and describe one simple means by which each desired result may be attained.

For instance, the gate 28 of the magazine 26 may be opened by the following means:

This gate 28 is hinged to a shaft 70 supported in brackets 71 secured to the upper end of the magazine 26, said gate being shaped to form one side, one end, and the bottom of the magazine.

The weight of the gate 28 retains it normally in closed position.

Pivoted at 74 to one end of the gate 28 is a lever 75 having formed therein slots, one of which has extending therethrough a projection 76 on the tripper rod 29.

Extending through the other slot is a projection 77 formed on a rod 78 reciprocable in ears 79 on the gate 28 and extending lengthwise thereof.

To one end of the rod 78 is secured a weight 78x which retains the rod 29 in the position shown in Fig. 14 with the pad 81 removed from the recess 82 in the end of gate 28.

When the pusher 27 is moved inwardly after ten pins have been inserted in the magazine, the pin first inserted will contact with the pad 80 and move it into the recess 81.

At the completion of this movement the hook 82 on rod 29 will engage the fixed hook 83 and prevent the rod moving in the opposite direction until the gate 28 is opened, the opening of the gate bringing the hooks 82, 83 out of alinement so that this return movement of said rod 29 can be effected by the weight 78x acting thereon through the rod 78 and lever 75.

When the rod 29 is moved outwardly it will move the lever 75 about its pivot 74 and force the rod 78 endwise toward the opposite end of the magazine raising the weight 78x.

This movement of the rod 78 will cause the opposite end thereof to be projected into the path of a lifting member 84 adapted to be reciprocated vertically in the bearing 85 mounted upon the framework 33.

The lower end of the lifting member 84 is articulated to an eccentric rod 86 which is actuated by an eccentric 87 on the revoluble shaft 88.

The lifting member 84 has secured thereto a collar 89 having adjustably mounted in an ear 90 thereof, an L-shaped rod 91, one end of which projects into an elongated slot 92 in a bell crank lever 93, pivoted at 94 and having a bifurcated upper end 95 coacting with projections 96 on the stem 97 of the pusher 27, said stem being reciprocable in a bearing 98 at one end of magazine 26.

When the lifting member 84 is moved upwardly it will open the gate 28 of magazine 26 and at the same time move the pusher 27 outwardly.

As soon as the gate 28 is opened the hooks 82, 83 will be disengaged and the weight 78x will return the pad 80 to the position shown in Fig. 14 and move the rod 78 out of the path of the lifting member 84.

This member 84 may then be reciprocated to actuate the pusher 27 but will not act upon the rod 78 until the magazine is again filled and the rod 78 is again moved into the path of the lifting member preparatory to again opening the gate 28.

The inner face of the rear wall of the magazine 26 has eleven concavities 90x formed therein to receive the pins forced into the magazine by pusher 27.

A weighted plate 91x with similar concavities in the face thereof rests upon the pins within the magazine and the two sets of concavities serve to keep the pins parallel and prevent the tilting thereof.

The plate 91x has arms 92x thereon having ears at the upper ends thereof through which the rod 70 passes.

The lower end of shaft 15 has a pulley 93x secured thereto which is driven by a belt 94x from a pulley 95x secured to the lower end of a shaft 96x, the upper end of which has secured thereto a bevel gear 97x meshing with a bevel gear 98x secured to and revoluble with the shaft 88.

When the shaft 96x is revolving the disk 14 will be rotated in the direction of arrow a on Fig. 10.

The shaft 88 rotates in bearings 99, and not only has the eccentric 87 keyed thereto but also has keyed thereto a worm gear 100 meshing with a worm 101 on the shaft 102 of a motor 103.

To the gear 100 is pivotally connected one end of a link 104 by means of pin 105.

The opposite end of said link is articulated to a rod 106 parallel to the plunger 23 and connected thereto by the block 107.

The rod 106 reciprocates in bearings in the support 108 which also provides a support for the lower end of pin conduit 22.

The shaft 88 has secured to one end thereof a pulley 109 which by means of a belt 110 rotates a pulley 111 on a shaft 57 for actuating the conveyor belts in the gutters 11.

The other shaft 57 has a pulley 112 thereon driving by means of a cross belt 113 a pulley 114 on the driving shaft 115 of the ball elevator 20.

One end of the bar 64 has a pin 116 extending laterally therefrom into a slot formed in the end of a bell crank lever 117 pivoted at 118 to a member 119 at the head of the alley.

One arm of lever 117 is in the form of a foot treadle 120 which may be depressed by the player to move the bar 64 endwise in its bearings to actuate the swinging arm 60.

The opposite end of bar 64 has a cable 121 secured thereto passing over a pulley 122 to a counter weight 123 which retains said bar in the position indicated in Fig. 4 under normal conditions.

This counter weight 123 will be lifted when the treadle arm 120 is depressed.

A guide rail 124 is mounted transversely of the alley on frame work 33 and on this rail is a carriage 125 having a downwardly extending arm 126 with an elongated plate 127 at the lower end, the lower edge of which is adjacent the face of the alley.

The carriage is connected by a cable 128 to a weight 129 which normally retains the plate 127 in a recess 130 in the side wall 68.

A cable 131 extends from the other end of the carriage 125 over a pulley 132 and under pulleys 133, 134 to the head of the alley where it passes over a pulley 135 through a stop member 136 and is provided with a ring 137 by which the cable 130 may be pulled causing the plate 127 to be moved across the alley to remove all deadwood on the alley in front of the pin spots.

The plate 127 is not used to remove all deadwood from the alley but to remove any pins which may land in front of the remaining pins before a string is finished.

At the head of the alley is a post 138 provided with a switch 139 which may control the operation of the motor 103 in any well known manner.

The conduit 22 is kept filled with pins at all times so that when the lower pin therein rests upon the latch member 25, the upper end of the upper pin therein will be flush with the bottom wall of the chamber of magazine 26.

When the plunger 23 moves forward and pushes another pin into the conduit 22 the upper pin will at the same time be pushed into the magazine 26, the pusher 27 at such time being out of the path of the incoming pin.

When the pins are new and all of the same length the conduit 22 from the latch 25 to the bottom wall of the magazine chamber may be made the exact length of the combined pins disposed end to end in said conduit 22.

Constant use of these pins, however, causes them to become worn and their ends must be refinished, thereby causing them to be shorter than their original length.

If the shorter pins were to be placed in the conduit 22 with the lower pin resting on latch 25, the upper end of the upper pin would not reach the bottom wall of the magazine chamber and the apparatus would not operate.

Consequently, provision is made for overcoming this objection.

When the pins are refinished all of them must be shortened to the same degree and when the shortening operation has been completed the latch 25 must be adjusted endwise to offset the combined shortening of all the pins within the conduit.

To accomplish this result the latch 25 is pivoted at 140 to a slotted bar 141 adjustable endwise on a support 142 and secured in adjusted position by the clamp screws 143.

When the latch 25 is adjusted as just described the plunger 23 must also be adjusted in the bar 107 so that at the end of its upward stroke its upper end 144 will be flush with the surface 145 on the latch 25.

When the plunger has been properly adjusted in the bar 107 it is secured in this adjusted position by the set screw 146.

By means of this construction adjustments may be made to take care of any shortening of the pins used on the alley.

When a pin is delivered from the chamber 16 into the conduit 22 the next forward movement of the plunger 23 will push the pin past the latch 25 which moves outwardly during the passage of said pin and immediately moves inwardly again as soon as the bottom of the pushed pin has passed the surface 145 thereby permitting the bottom of said pin to rest upon said surface 145.

In starting to play a game the switch 139 is actuated to place the motor 103 in operation.

This motor will immediately rotate the disk 14, move the belts 53 in gutters 11, actuate the elevator 20, reciprocate the plunger 23, and impart a vertical reciprocation to the rod 84 and thereby a horizontal reciprocation of the pusher 27.

Should there be at this time any pins in the pit 12 they will be removed therefrom into the conduit 22 and delivered to magazine 26.

If there are no pins in the pit 12 at this time, the devices will continue to operate without performing any office.

The conduit 22 is filled with pins, however, and there is a reserve supply of pins in the tubes 30 and one set in the pockets 43, 45.

If there is more or less deadwood on the alley, the operator depresses the treadle 120 and thereby operates the sweeper 60, 66 forcing all such deadwood into the pit 12 where the pins will be carried away through the conduit 22 to the magazine 26.

When the alley is clear, the operator disengages the lever 40x from the projection 41 and moving said lever toward the pit 12 permits the plate 36 to move downwardly.

At this time there will be pins resting on the members 45 in an inclined position and as the plate 36 moves downwardly they will assume a vertical position and be properly set and then the operator moves the lever 40x toward him and engages it with the projection 41.

The plate 36 will at this time be elevated in the position indicated in Fig. 2 and the bowling can commence.

When the plate 36 is lowered it will never contact with the alley and mar the same as the bar 37 will come into contact with the guide members 34 and limit the downward movement of said plate 36.

No part of the various mechanisms contact with the face of the alley and therefore the alley cannot be injured thereby.

If desired the hooks 82, 83 may be dispensed with and the reciprocating rod 78 be provided with a notch 178 with which the upper end of the lifter 84 may engage to prevent the weight 78x moving said rod 78 until the gate 28 has been closed and the lifter 84 disengaged from said notch 178.

This makes a very effective construction of bowling alley in which the pins may be accurately set without using pin boys.

The operation and many advantages of the invention will be obvious without further description.

Having thus described my invention, I claim:

1. A bowling alley provided with a pit; a revoluble disk in the bottom of the pit; a pin chamber tangential to said disk adapted to receive a plurality of pins disposed one above the other; a conduit extending from one end of said chamber; and a reciprocating plunger for pushing the under pin from said chamber into said conduit.

2. A bowling alley provided with a pit; a revoluble disk in the bottom of the pit; a pin chamber tangential to said disk adapted to receive a plurality of pins disposed one above the other; a conduit extending from one end of said chamber; a reciprocating plunger for pushing the under pin from said chamber into said conduit; and means for preventing the return of said pin into said chamber.

3. A bowling alley provided with a pit; a revoluble disk in the bottom of the pit; a pin chamber tangential to said disk adapted to receive a plurality of pins disposed one above the other; a conduit extending from one end of said chamber; a reciprocating plunger for pushing the under pin from said chamber into said conduit; a magazine adjacent the opposite end of said pin conduit; and means for pushing pins sidewise into said magazine as they are delivered from said conduit.

4. A bowling alley provided with a pit; a revoluble disk in the bottom of the pit; a pin chamber tangential to said disk adapted to receive a plurality of pins disposed one above the other; a conduit extending from one end of said chamber; movable means for inserting the under pin in said chamber into said conduit; a magazine adjacent the opposite end of said pin conduit; mechanism for pushing pins sidewise into said magazine as they are delivered from said conduit; and means for actuating said pushing mechanism at the completion of the forward movement of said pin inserting mechanism.

5. A bowling alley provided with a pit having sides inclined downwardly and inwardly; a revoluble disk in the bottom of the pit; a pin chamber tangential to said disk adapted to receive a plurality of pins disposed one above the other; a conduit extending from one end of said chamber; a reciprocating plunger for pushing the under pin from said chamber into said conduit; a magazine adjacent the opposite end of said pin conduit; means for pushing pins sidewise into said magazine as they are delivered from said conduit; and mechanism for actuating both the pushing means and said plunger and causing a forward movement of the pushing means during the return stroke of the plunger.

6. A bowling alley provided with a pit having sides inclined downwardly and inwardly; a revoluble disk in the bottom of the pit; a pin chamber tangential to said disk adapted to receive a plurality of pins disposed one above the other; a conduit extending from one end of said chamber; a reciprocating plunger for pushing the under pin from said chamber into said conduit; a magazine adjacent the opposite end of said pin conduit; means for pushing pins sidewise into said magazine as they are delivered from said conduit; a gate at the bottom of said magazine; and means for opening said gate and releasing the pins when the magazine has been filled.

7. A bowling alley provided with a magazine above the alley and containing a plurality of pins; automatic means for simultaneously releasing the pins when the magazine is filled; a plate lower than said magazine adapted to be vertically raised end lowered; tubes to which said pins are delivered from said magazine; cylindrical pockets on said plate to receive said pins in inclined positions when released from said tubes, said pockets being open at the bottom; means pivoted to said pockets for supporting the pins in said inclined positions until said plate approaches its lowest position; and means for actuating said supporting means and tilting said pins into vertical position in said pockets prior to the return of said plate to its elevated position.

8. A bowling alley provided with a magazine above the alley and containing a plurality of pins; tubes extending from said magazine; automatic means for releasing the pins when the magazine is filled and simultaneously delivering them endwise to said tubes; a plate lower than said magazine adapted to be vertically raised and lowered; tubular members projecting upwardly from said plate with their lower ends open and their upper ends semi-cylindrical; semi-cylindrical members pivoted to the lower ends of said tubular members and normally inclined in position to receive the pins when released from said tubes; and means for moving said pivoted members into vertical position as said plate reaches a position immediately above the alley.

9. A bowling alley provided with a magazine above the alley and containing a plurality of pins; tubes extending from said magazine, each tube being adapted to contain a plurality of pins; automatic means for releasing the pins when the magazine is filled and simultaneously delivering them endwise to said tubes; a gate pivotally connected to the lower end of each tube adapted to be opened and release the lower pin in said tube; a plate lower than said magazine adapted to be raised and lowered; tubular members projecting upwardly from said plate with their lower ends open and their upper ends semi-cylindrical; semi-cylindrical members pivoted to the lower ends of said tubular members and normally inclined in position to receive the pins when released from said tubes; and means for moving said pivoted members into vertical position as said plate reaches a position immediately above the alley.

10. A bowling alley provided with a magazine above the alley and containing a plurality of pins; automatic means for releasing the pins when the magazine is filled; tubes to which said pins are delivered from said magazine; a plate lower than said magazine adapted to be raised and lowered; tubular members projecting upwardly from said plate with their lower ends open and their upper ends semi-cylindrical; semi-cylindrical members pivoted to the lower ends of said tubular members and normally inclined in position to receive the pins when released from said tubes; a spider above and movable downwardly with said plate and on portions of which said pivoted members rest; and means for stopping the downward movement of said spider before the plate reaches its lowest position whereby the pivoted members will be moved simultaneously into vertical positions and permit the discharge of the pins from said tubular members.

11. A bowling alley provided with a magazine above the alley and containing a plurality of pins; automatic means for releasing the pins when the magazine is filled; tubes to receive the pins endwise when discharged from the magazine; a gate pivoted to the lower end of each tube; a plate beneath said tubes adapted to be vertically raised and lowered; a plurality of pockets on said plate adapted to receive said pins when said gates are open and the pins released from said tubes; means actuated by said plate in its upward movement for opening said gates; and means for releasing said pins from said pockets as said plate reaches its lowest position.

12. A bowling alley provided with a magazine above the alley and containing a plurality of pins; automatic means for releasing the pins when the magazine is filled; tubes to receive the pins endwise when discharged from the magazine; a gate pivoted to the lower end of each tube; a plate beneath said tubes adapted to be vertically raised and lowered; tubular members projecting upwardly from said plate with their lower ends open and their upper ends semi-cylindrical; semi-cylindrical members pivoted to the lower ends of said tubular members and normally inclined in position to receive the pins when released from said tubes; and means for moving said pivoted members to tilt the pins thereon into vertical position as said plate reaches a position immediately above the alley.

13. A bowling alley provided with a pit at the end thereof to receive the upset pins; an arm pivoted at one side of the alley of a length substantially the width of said alley; means for moving said arm about its pivot to remove the deadwood into said pit; and an extension to said arm connected thereto by a spring hinge, said spring having sufficient tension to normally retain said arm and extension in alinement.

14. A bowling alley provided with a pit at the end thereof to receive the upset pins; an arm pivoted at one side of the alley of a length substantially the width of said alley; means for moving said arm about its pivot to remove the deadwood into said pit; and an extension to said arm connected thereto by a spring hinge, said spring having sufficient tension to normally retain said arm and extension in alinement, said extension having a roller at the outer end thereof.

15. A bowling alley provided with a magazine above the alley and containing a plurality of pins; automatic means for releasing the pins when the magazine is filled; a plate lower than said magazine adapted to be vertically raised and lowered; immovable tubes to receive said pins when released from the magazine; weighted gates pivoted to the lower ends of said tubes; pockets on said plate adapted to receive pins from said tubes; means for simultaneously opening all of said gates; means for retaining the pins in said pockets until said plate approaches its lowest position; and means for actuating said retaining means and releasing said pins from said pockets prior to the return of said plate to its elevated position.

16. A bowling alley provided with a pit at the end thereof to receive the upset pins and having a recess in a side wall in front of the pin spots of the alley; an elongated member normally disposed in said recess with its lower edge adjacent the face of the alley; a horizontal guide for said member extending transversely of the alley; means for moving said member across the alley and removing the deadwood in front of the pin spots into the alley gutters and means in said gutters for moving said deadwood into said pit.

17. A bowling alley provided with a pit; a revoluble disk in the bottom of the pit; a conduit extending tangentially from said pit and adapted to receive pins therefrom; a latch adapted to prevent the return of a pin delivered to said conduit; and a plunger for forcing pins into said conduit.

18. A bowling alley provided with a pit; a revoluble disk in the bottom of the pit; a conduit extending tangentially from said pit and adapted to receive pins therefrom; a latch adapted to prevent the return of a pin delivered to said conduit; a plunger for forcing pins into said conduit; and means for adjusting the position of said latch endwise relatively to said conduit.

19. A bowling alley provided with a pit; a revoluble disk in the bottom of the pit; a conduit extending tangentially from said pit and adapted to receive pins therefrom; a latch adapted to prevent the return of a pin delivered to said conduit; a plunger for forcing pins into said conduit; means for adjusting the position of said latch endwise relatively to said conduit; a reciprocating member for imparting movement to said plunger; and means for adjusting said plunger endwise relatively to said member.

20. A bowling alley provided with a pit; a revoluble disk in the bottom of said pit inclined downwardly toward the head of the alley; a discharge passage for balls extending from the lower edge of said disk; and another passage from another part of said disk through which the pins are adapted to be discharged endwise.

21. In a bowling alley provided with a pin setting mechanism, a magazine having an inner wall provided with a plurality of concavities; means for pushing pins into said magazine to be disposed in said concavities; and a weighted member for retaining said pins in said concavities until released.

22. A bowling alley provided with a closed pin magazine; means for inserting pins endwise through one end of the bottom of said magazine; and means movable endwise of said magazine for pushing sidewise toward the opposite end of said magazine each pin when inserted.

23. A bowling alley provided with a closed pin magazine; means for inserting pins endwise through one end of the bottom of said magazine; means movable endwise of said magazine for pushing sidewise towards the opposite end of said magazine each pin when inserted; and mechanism for actuating alternately said inserting means and said pushing means.

24. A bowling alley provided with a pin magazine; a conduit extending from the bottom of one end of said magazine and adapted to be filled with pins; means at the opposite end of said conduit for inserting another pin into said conduit and simultaneously discharging a pin from the opposite end of said conduit into said magazine; and means for pushing sidewise towards the opposite end of said magazine each pin when inserted into said magazine.

25. A bowling alley provided with a pin setting mechanism, an inclined pin magazine closed except at the bottom thereof; tubes leading from said magazine to said pin setting mechanism; with their upper ends in alinement beneath the bottom of said magazine; a gate pivoted to said magazine and normally closing said bottom; means for filling said magazine; and means for automatically actuating said gate and simultaneously discharging a pin endwise into each tube when said magazine has been filled.

26. A bowling alley provided with a pin setting mechanism including a plate movable vertically above the alley and having a plurality of pin holes therein; means mounted on and movable with said plate for supporting pins; and means above said plate and movable vertically therewith operable when said plate reaches a plane adjacent the top of the alley to release said pins from said supporting means and set them on the alley.

27. A bowling alley provided with a pit; a single revoluble disk in the bottom of said pit on which the used balls and pins are adapted to be disposed; a downwardly inclined passage through which the used balls may be discharged from said pit; and another passage tangential to a side wall of said pit through which the used pins may be discharged endwise.

28. A bowling alley provided with a pit having an opening in the bottom thereof; a single revoluble disk below said opening; and separate passages extending from said pit flush with the upper face of said disk through which the balls and pins may be discharged respectively during the rotation of said disk.

29. A bowling alley provided with a pit having an opening in the bottom thereof; a single revoluble disk below said opening and inclined; a ball discharge passage from said pit at the lowest part of said disk; and a smaller discharge passage from said pit at a higher level into which the pins may be discharged endwise.

30. A bowling alley provided with a pit; a single revoluble disk in the bottom of said pit; a conduit extending tangentially from a side wall of said pit and adapted to receive pins therefrom; a latch adapted to prevent the return of a pin delivered to said conduit; and movable means beneath said disk for inserting pins into said conduit.

31. A bowling alley provided with a pit; a single revoluble disk in the bottom of the pit; a conduit extending tangentially from a side wall of said pit and adapted to receive pins therefrom; a latch adapted to prevent the return of a pin delivered to said conduit; movable means beneath said disk for inserting pins into said conduit; means for adjusting the position of said latch endwise relatively to said conduit; and means for adjusting the position of said movable means relatively to said conduit.

32. A bowling alley provided with an inclined pin magazine above the alley adapted to receive a required number of pins disposed side by side; a movable bottom plate to said magazine at the lower ends of said pins; means for automatically moving said bottom plate from the path of said pins when the magazine has been filled whereby all of the pins in said magazine may be simultaneously discharged endwise; inclined tubes to receive said pins when discharged from the magazine; and a vertically moving pin setting mechanism to which said pins are adapted to be delivered from the lower ends of said tubes.

33. A bowling alley provided with an inclined pin magazine above the alley adapted to receive a required number of pins disposed side by side; a movable bottom plate to said magazine at the lower ends of said pins; means for automatically moving said bottom plate from the path of said pins when the magazine has been filled whereby all of the pins in said magazine may be simultaneously discharged endwise; inclined tubes to receive said pins when discharged from the magazine; a single pivoted gate at the lower end of each of said tubes; a vertically moving pin setting mechanism to which said pins are adapted to be delivered from the lower ends of said tubes; and means movable with said pin-setting mechanism for opening all of said gates during the upward movement of said pin setting mechanism.

34. A bowling alley provided with an inclined pin magazine above the alley adapted to receive a required number of pins disposed side by side; a movable bottom plate to said magazine at the lower ends of said pins; means for moving said bottom plate from the path of said pins when the magazine has been filled whereby the pins may be discharged endwise; inclined tubes to receive said pins when discharged from the magazine; gates pivoted to the lower ends of said tubes; a vertically moving pin setting mechanism to which said pins are adapted to be delivered from the lower ends of said tubes; and members extending upwardly from the pin setting mechanism adapted during the upward movement of said mechanism to engage said gates and move them about their pivots thereby permitting the discharge of a set of pins from said tubes.

35. A bowling alley provided with an inclined magazine above the alley adapted to receive a required number of pins disposed side by side; a movable bottom plate to said magazine at the lower ends of said pins; means for moving said bottom plate from the path of said pins when the magazine has been filled whereby the pins may be discharged endwise; inclined tubes to receive said pins when discharged from the magazine; a vertically moving pin setting mechanism to which said pins are adapted to be delivered from the lower ends of said tubes including a plurality of pin pockets having pivoted thereto inclined semi-cylindrical members to receive the pins delivered from said tubes; and means for moving said members about their pivots into vertical position during the downward movement of the pin setting mechanism.

36. A bowling alley provided with a vertically reciprocating perforated plate; a tubular member in each perforation having a semi-cylindrical upward extension; a complemental semi-cylindrical member pivoted to said tubular member and adapted when closed to coact with said extension to form a complete cylinder, said pivoted member being inclined downwardly toward said extension; and means operable at a predetermined time to move said pivoted member into vertical position.

37. A bowling alley provided with a vertically reciprocating perforated plate; a tubular member in each perforation having a semi-cylindrical upward extension; a complemental semi-cylindrical member pivoted to said tubular member and adapted when closed to coact with said extension to form a complete cylinder, said pivoted member under normal conditions being inclined downwardly toward said extension; a spider resting upon said plate and having limited movement therewith and upon which said pivoted members rest; and means for limiting the downward movement of said spider during the lowering of said plate whereby said pivoted members will be moved thereby into vertical position.

38. A bowling alley provided with a vertically reciprocating perforated plate; a tubular member in each perforation having a semi-cylindrical upward extension; a complemental semi-cylindrical member pivoted to said tubular member adapted when closed to coact with said extension to form a complete cylinder, said pivoted member being inclined downwardly toward said extension; an inclined pin tube for each tubular member; a gate normally closing the lower end thereof; an upwardly extending finger on each pivoted member adapted to coact with said gate and raise the same when in the upward movement of said plate said pivoted member is about to be alined with said tube; and means operable at a predetermined time to move said pivoted member into vertical position.

39. A bowling alley provided with a vertically reciprocating perforated plate; a tubular member in each perforation having a semi-cylindrical upward extension; a complemental semi-cylindrical member pivoted to said tubular member adapted when closed to coact with said extension to form a complete cylinder, said pivoted member being inclined downwardly toward said extension; an inclined pin tube for each tubular member; a gate normally closing the lower end thereof; an upwardly extending finger on each pivoted member adapted to coact with said gate and raise the same when in the upward movement of said plate said pivoted member is about to be alined with said tube; a depending weight on said gate adapted to close said gate after the delivery of each pin and prevent the discharge of another pin until the next upward movement of said plate; and means operable at a predetermined time to move said pivoted member into vertical position.

40. A bowling alley provided with a pit; a single disk in the bottom of said pit inclined downwardly and revoluble about an axis midway of the width of said alley; and an inclined ball chute communicating at its upper end with said pit adjacent the lower edge of said disk and approximately tangential thereto.

41. A bowling alley provided with a pin magazine above the alley adapted to receive a required number of pins disposed in contact with each other and side by side; a removable bottom to said magazine adapted to be automatically raised and simultaneously release the pins endwise when the magazine has been filled; inclined tubes to receive said pins the upper ends of which tubes are in the same plane; and mechanism to which the pins are delivered from said tubes adapted to move downwardly and properly set them on the top of the alley.

42. A bowling alley provided with a pit having an opening entrance thereto; movable means below said opening for moving the balls and pins toward the wall of said pit; a passage extending from one side of said pit through which the pins may be discharged therefrom; and a ball passage communicating with said pit at another side thereof and inclined downwardly therefrom towards the head of said alley.

Signed by me at Boston, Massachusetts, this 24th day of December, 1928.

RAYMOND A. WILLIAMS.